(12) United States Patent
Lazu

(10) Patent No.: US 10,917,458 B2
(45) Date of Patent: Feb. 9, 2021

(54) MESSAGE BROKER CONFIGURATION

(71) Applicant: Pivotal Software, Inc., San Francisco, CA (US)

(72) Inventor: Gerhard Lazu, South Croydon (GB)

(73) Assignee: Pivotal Software, Inc., San Francisco, CA (US)

( * ) Notice: Subject to any disclaimer, the term of this patent is extended or adjusted under 35 U.S.C. 154(b) by 151 days.

(21) Appl. No.: 16/188,158

(22) Filed: Nov. 12, 2018

(65) Prior Publication Data

US 2020/0153888 A1 May 14, 2020

(51) Int. Cl.
*G06F 15/173* (2006.01)
*H04L 29/08* (2006.01)

(52) U.S. Cl.
CPC .................... *H04L 67/10* (2013.01)

(58) Field of Classification Search
CPC ... H04L 67/10; H04L 29/08144; H04L 29/06; H04L 29/08072; H04L 29/08171
See application file for complete search history.

(56) References Cited

U.S. PATENT DOCUMENTS

| 7,702,724 | B1 | 4/2010 | Brydon et al. | |
|---|---|---|---|---|
| 7,822,065 | B2 * | 10/2010 | Lu | H04W 88/02 370/328 |
| 8,099,316 | B2 * | 1/2012 | Moukas | G06Q 10/0631 705/7.29 |
| 8,140,630 | B2 | 3/2012 | Jones et al. | |
| 8,346,935 | B2 * | 1/2013 | Mayo | G06F 9/5077 709/226 |
| 8,423,619 | B2 | 4/2013 | Hawkins et al. | |
| 8,504,689 | B2 * | 8/2013 | Ferris | H04L 69/329 709/226 |
| 8,577,823 | B1 * | 11/2013 | Gadir | H04L 29/08072 706/45 |

(Continued)

FOREIGN PATENT DOCUMENTS

| CN | 106254127 | 12/2016 |
|---|---|---|
| WO | WO 2014/189737 | 11/2014 |

OTHER PUBLICATIONS

International Search Report and Written Opinion in International Appln. No. PCT/US2019/060719, dated May 7, 2020, 14 pages.

*Primary Examiner* — Razu A Miah
(74) *Attorney, Agent, or Firm* — Fish & Richardson P.C.

(57) ABSTRACT

Methods, systems, and apparatus, including computer programs encoded on computer storage media, for providing guided provisioning and configuration of a message broker cluster. One of the methods includes maintaining a message broker platform system configured to host one or more message broker clusters in a cloud computing environment of a distributed computing system. A first software platform system configured to host user-provided computing tasks in the distributed computing system receives a computing task, provisions computing resources in an underlying cloud computing infrastructure, and launches one or more instances of the computing task using the provisioned computing resources in the underlying cloud computing infrastructure. The message broker platform system binds the computing task in the first software platform system to the message broker cluster in the message broker platform system.

23 Claims, 3 Drawing Sheets

(56) References Cited

U.S. PATENT DOCUMENTS

| | | | |
|---|---|---|---|
| 8,725,798 B2* | 5/2014 | Alam | G06F 9/5072 709/203 |
| 8,775,500 B2* | 7/2014 | Watanabe | H04L 67/1002 709/202 |
| 9,038,091 B2 | 5/2015 | Jonnagadla et al. | |
| 9,043,453 B1* | 5/2015 | Kielhofner | H04L 29/08072 709/223 |
| 9,390,390 B1* | 7/2016 | Wertheimer | G06Q 10/06313 |
| 9,413,702 B2 | 8/2016 | Yang et al. | |
| 9,451,322 B2* | 9/2016 | Willis | H04N 21/64322 |
| 9,825,881 B2* | 11/2017 | Johnston | H04L 47/827 |
| 9,999,030 B2* | 6/2018 | Gu | H04L 67/1095 |
| 10,129,177 B2* | 11/2018 | Chang | H04L 12/66 |
| 10,187,323 B2 | 1/2019 | Laplanche et al. | |
| 2011/0295999 A1* | 12/2011 | Ferris | H04L 69/329 709/224 |
| 2011/0296000 A1* | 12/2011 | Ferris | G06Q 10/00 709/224 |
| 2012/0136940 A1 | 5/2012 | Vecera et al. | |
| 2012/0304170 A1* | 11/2012 | Morgan | G06F 9/45558 718/1 |
| 2012/0317223 A1* | 12/2012 | Watanabe | G06F 9/4843 709/208 |
| 2012/0330711 A1* | 12/2012 | Jain | G06Q 30/04 705/7.23 |
| 2012/0331113 A1* | 12/2012 | Jain | H04L 41/5025 709/220 |
| 2013/0055288 A1* | 2/2013 | Jonnagadla | G06F 9/546 719/317 |
| 2013/0060834 A1* | 3/2013 | Paramasivam | H04L 12/66 709/202 |
| 2013/0060928 A1 | 3/2013 | Shao | |
| 2013/0297685 A1* | 11/2013 | McGrath | H04L 67/2814 709/204 |
| 2014/0068082 A1* | 3/2014 | Della Corte | H04L 67/1008 709/226 |
| 2014/0201344 A1* | 7/2014 | Copsey | H04L 67/1004 709/223 |
| 2014/0245262 A1* | 8/2014 | Hill | G06F 8/60 717/120 |
| 2015/0113100 A1* | 4/2015 | Tweedale | H04L 67/02 709/219 |
| 2015/0229592 A1* | 8/2015 | Rathod | G06F 3/0482 709/206 |
| 2015/0237157 A1* | 8/2015 | Wang | H04L 41/0668 714/4.11 |
| 2015/0310401 A1* | 10/2015 | Siracusa | G06F 11/3495 705/39 |
| 2015/0339367 A1* | 11/2015 | Stam | G06F 16/27 707/645 |
| 2016/0092319 A1* | 3/2016 | Parkinson | G06F 9/466 707/679 |
| 2016/0156502 A1 | 6/2016 | Fugitt et al. | |
| 2016/0294969 A1* | 10/2016 | Ghosh | H04L 51/066 |
| 2017/0099362 A1* | 4/2017 | Almond | H04L 67/26 |
| 2017/0339070 A1* | 11/2017 | Chang | H04L 47/829 |
| 2017/0351716 A1* | 12/2017 | Higginson | G06F 16/214 |
| 2018/0032543 A1 | 2/2018 | Fecioru et al. | |
| 2018/0101822 A1 | 4/2018 | Caldwell et al. | |
| 2018/0145923 A1* | 5/2018 | Chen | G06F 9/5077 |

* cited by examiner

MESSAGE BROKER CONFIGURATION

BACKGROUND

This specification relates to cloud computing platforms, and more particularly to integrated application platforms.

A cloud application platform is platform-as-a-service ("PaaS") cloud computing system that allows users to deploy and manage multiple instances of network-accessible applications, which for brevity will also be referred to as simply applications or, when additional context is required, platform applications. The applications are executed by hardware of an underlying cloud computing infrastructure, which may or may not be provided by a different entity, e.g., an entity providing an infrastructure-as-a-service ("IaaS") platform. The cloud application platform can handle provisioning of resources in the underlying cloud computing infrastructure as well as staging and launching of applications using the provisioned resources. Therefore, developers who use the cloud application platform need not spend time building or configuring the hardware of a cloud computing system. Rather, the developers can focus on the application development itself, and rely on the services provided by the cloud application platform to launch and manage instances of the application. After being launched, the application instances can be used by end users over a network, e.g., the Internet.

A primary goal of cloud application platforms is self-service for application developers and platform operators. Self-service refers to the ability of an entity to select and provision their own computing resources without requiring the intervention of a human operator or the approval of a human operator.

Some cloud application platforms provide integrated message brokers. A message broker is a software subsystem that receives messages from producing applications and delivers them to consuming applications. Typically, message brokers store received messages in one or more queues and use a cluster of one or more nodes to process messages in the queues until they reach their destination consumers. An example of a message broker that can be integrated with a cloud application platform is RabbitMQ, which is available from Pivotal Software, Inc. ("RabbitMQ" is a trademark of Pivotal Software, Inc.)

Message brokers are very powerful, but their power can hinder the performance goals of a cloud application platform because message brokers can consume significant network and computing resources. For high-performance use cases, message brokers can throttle network connections, CPU utilization, disk space, and memory usage. These issues are performance problems in and of themselves, and, in addition, the effects of such performance issues often spill over and degrade the performance of the applications themselves. Debugging such issues is complicated because to an application developer or an end user, it is not readily apparent that the source of the problem is an integrated message broker. This is partially because developers do not tend to have any visibility into the resource allocation decisions of the underlying computing infrastructure.

In addition, message brokers can hinder the self-service goals of a cloud application platform because they tend to have very complicated configuration options. Users who wish to install a message broker are faced with a bewildering array of possible configuration options. This situation often requires users to request expert advice or customer support in order to set up and configure a message broker.

SUMMARY

This specification describes technologies that provide for a guided and semi-automatic configuration of hardware-isolated message brokers for software platforms. These techniques solve the aforementioned barriers to self-service imposed by message brokers, and enables message brokers to provide service with expected performance and with cross-software-platform interoperability.

Particular embodiments of the subject matter described in this specification can be implemented to realize one or more of the following advantages. A software platform system that can provide a message broker platform with hardware isolation from client applications can do more to ensure that the message broker provides expected performance at all times. The self-service architecture allows developers and platform operators to install a message broker with minimal manual configuration which still adhering to target values of performance parameters for different use cases. The message broker platform allows a user to provision and configure a message broker cluster using only a handful of commands that are simple enough to be issued on the command line. The message broker platform can be used across multiple heterogeneous software platforms. By allowing a developer to select a type of workload for the service broker, the platform can present targeted online documentation pages for using that type of workload.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
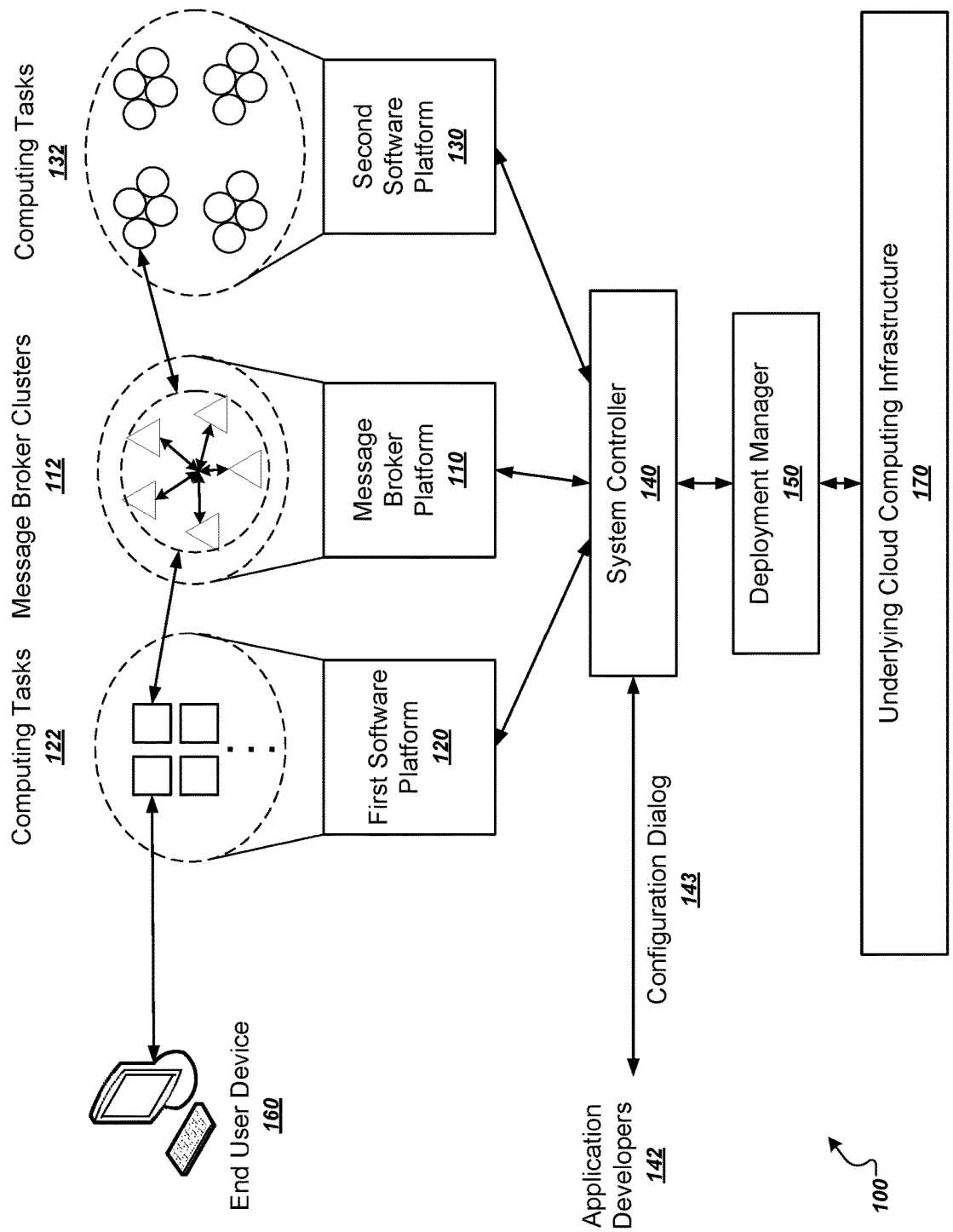
FIG. 1 illustrates an example system 100 having a message broker platform.

FIG. 1 illustrates an example system 100 having a message broker platform 110. The message broker platform 110 hosts message broker clusters 112 that can be used by computing tasks hosted on one or more software platforms, e.g., software platforms 120 and 130.

A system controller 140 is a software system that coordinates the setup and management of the three platform systems 110, 120, and 130. To do so, the system controller 140 makes use of a deployment manager 150 that can provision appropriate resources in an underlying cloud computing infrastructure 170. For example, the deployment manager 150 can be implemented using the open source BOSH project. Techniques for on-demand resource provisioning are described in commonly-owned U.S. patent application Ser. No. 15/256,275, filed on Sep. 2, 2016, entitled, "On-Demand Resource Provisioning," which is herein incorporated by reference.

The system 100 can be set up and configured by operators of an entity that maintains the system 100. These can include platform operators that maintain the first software platform 120, platform operators that maintain the second software platform 130, and operators that maintain the message broker platform 110. Although the system 100 is illustrated as having both a first software platform 120 and a second software platform 130, there can be a single software platform or more than two software platforms that are all connected to a single message broker platform 110.

For simplicity, the examples below will often refer to certain actions being performed by application developers. However, where this specification describes an action being performed by an application developer, the same or a similar action can be performed by a platform operator of one or more software platforms or the message broker platform 110.

An application developer can launch computing tasks in one or more of the software platforms 120 and 130. To do so, the application developer can provide, to the system controller 140, a reference to the software required to launch the computing task in the respective platform. The actual format of the software will typically vary depending on the different types of software platforms. In addition, the software selected by an application developer may actually be maintained by the operators of the system. For example, the system controller 140 can provide to an application developer 142 a list of all available software to run in one or both of the software platforms 120 and 130.

Application developers or platform operators can also launch message broker clusters 112 in the message broker platform 110. Unlike launching an application, typically an application developer does not need to provide the software for the message broker. Rather, the system 100 can maintain one or more preferred message broker versions, and an application developer can simply specify which message broker to be installed. Therefore, the system 100 can support initialization of a message broker cluster with a relatively small number of command line commands. The system controller 140 can then use the deployment manager 150 to take care of initializing the underlying computing resources in the underlying cloud computing infrastructure 170.

To launch and configure a message broker cluster in the message broker platform 110, a developer can engage in a configuration dialog 143 with the system controller 140. This allows the developer to issue just a handful of commands in order to launch a message broker cluster in the message broker platform system 110 that is tuned for a particular use case that the developer selects. Techniques for the system controller 140 to aid an application developer in setting up and configuring a message broker installation using a configuration dialog 143 are described in more detail below with reference to FIG. 2.

Because the message broker platform 110 is independent from either of the software platforms 120 or 130, an application developer can actually create a message broker cluster 112 before launching any computing tasks in the software platforms 120 or 130. The application developer can then launch computing tasks in one or more platforms and bind those computing tasks to one or more message broker clusters 112 in the message broker platform 110.

An application developer can bind a computing task executing in either of the software platforms 120 or 130 to a message broker cluster 112 in the message broker platform 110 as a message producer, a message consumer, or both. For example, computing tasks 122 can provide messages to a message broker cluster 112 and can consume messages from the message broker cluster 112. Likewise, computing tasks 132 can also provide messages to a message broker cluster 112 and can consume messages from the same message broker cluster 112.

Notably, the architecture of the system 100 allows application developers to bind computing tasks hosted in different software platforms to the same message broker cluster in the message broker platform. There are a number of reasons why an application developer would want to integrate the functionality of two different software platforms in this way. In general, it comes down to the system being able to provide the right tools for the different tasks at hand.

One example integration of two different software platforms with a common message broker the message broker platform 110 is to use a cloud application platform with a container orchestration platform. An example of a container orchestration platform is Pivotal Container Service, which provides the functionality for launching Kubernetes clusters to run container workloads.

A cloud application platform is typically an environment designed for high-productivity software development. Therefore, much of the underlying configurations and dependencies are handled automatically, e.g., using frameworks and other integrated development tools, during staging and launching of the applications.

On the other hand, container orchestration platforms are better for hosting third-party, off-the-shelf software that may not have been written with development environment of the cloud application platform in mind. Thus, it is possible to adapt third-party, off-the-shelf software for use on a cloud application platform, doing so would typically require much more work and configuration that simply launching the software in one or more container workloads of a container cluster running an already compatible operating system.

And both of these types of software platforms can benefit from high-performance message brokers implemented using a hardware-isolated message broker platform.

As described above, properly configuring a message broker cluster for a particular use case can involve a bewildering number of configuration options. In general, the following layers of configuration options can be tuned:
- Message Broker Layer—involves the settings of the message broker nodes themselves
- Runtime Layer—involves the settings of the runtime software on which the cluster applications will run.
- OS Layer—involves the settings of the operating system that will be used to execute the cluster nodes.
- IaaS Layer—involves the attributes of the physical hardware that will be provisioned to implement the message broker cluster In addition to these layers, the system 100 can also support configuration options for a Client Layer, which involves the settings of the client software tasks that will use the message broker. For example, for developer applications to be launched on a cloud application platform, the system controller 140 can modify the client layer settings while staging and launching application instances on the cloud application platform. Alternatively or in addition, the system controller 140 can simply indicate to a developer which client layer configuration options would be best for the particular use case. For example, the system can suggest to a developer that the client application use particular service broker settings in their application code, e.g., enabling "publisher confirms" if the developer selected low-latency messaging.

Figure 2:
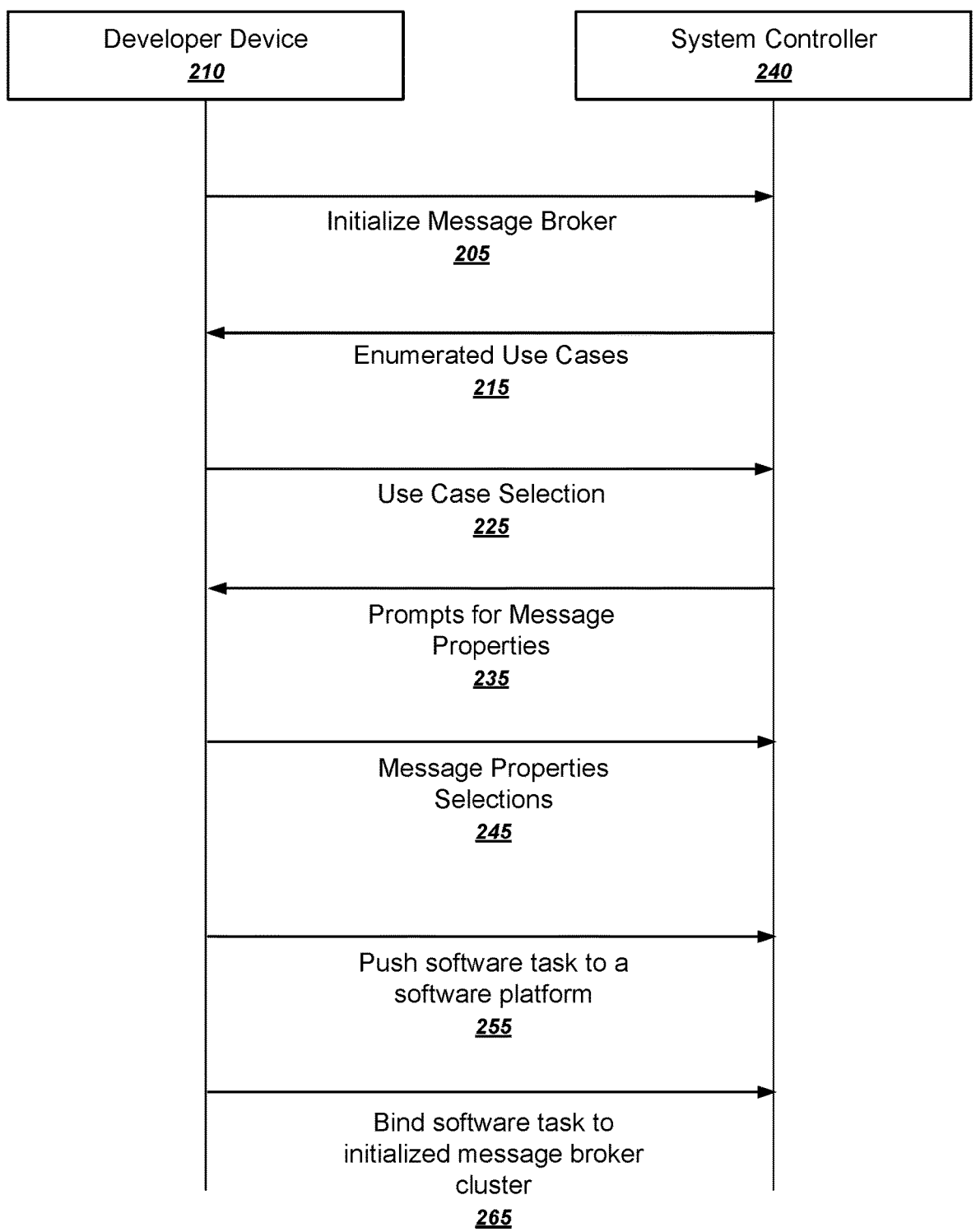
FIG. 2 illustrates interactions between a system controller and developer device for guided configuration of a message broker cluster.

FIG. 2 illustrates interactions between a system controller 240 and developer device 210 for guided configuration of a message broker cluster. The guided configuration process allows the self-service by developers of a high-performance message brokers for particular use cases without intervention or help from an expert.

The interactions illustrated in FIG. 2 will be described as interactions involving a command line interface at the developer device 210 interacting with a system controller 240 over a network, e.g., an intranet or the Internet. Although the following example illustrates the handful of command line commands that can be used to launch a message broker cluster, the same interactions can also be implemented using any appropriate graphical user interface, e.g., a web browser.

The developer device 210 provides a request to initialize a message broker (205). For example, the developer device can log onto the cloud computing system described in FIG. 1. The developer can then issue the following example command line command:

$>sc create message_broker

In this example, the "sc" term in the command names the system controller 240 that should handle the command. The "create" term identifies an action to be performed by the system controller 240. In this example, "create" specifies that the system controller should automatically provision underlying computing resources in the cloud computing infrastructure in order to implement a message broker cluster for the named message broker. In this example, the named message broker is "message_broker." The developer device 210 optionally provide one or more other options, e.g., a version identifier of for the named message broker to be installed.

The system controller 240 responds by providing an enumerated set of use cases (215). The aim of the guided configuration process is to provide self-service for high-performance message brokers. However, what is considered high-performance or even expected performance varies widely for different use cases.

For example, for some use cases, low-latency is the most important factor. In those situations, the developer would like to ensure that the chosen configuration and provisioned computing resources for the message broker cluster allow all or at least a threshold percentage of messages to be delivered with at least a particular throughput threshold and within a particular time threshold, e.g., within 1, 10, 100, or 1000 ms.

In other use cases, high-throughput is the most important factor. In those situations, the developer would like to ensure that the chosen configuration and provisioned computing resources for the message broker cluster can almost always or always handle up to a threshold number of messages moving through the message broker cluster.

In yet other use cases, high-scale is the most important factor. In those situations, the developer would like to ensure that the chosen configuration and provisioned computing resources for the message broker cluster allow the cluster to handle up to a threshold number of simultaneous connections, e.g., up to 1000, 100,000, or 1 million simultaneous connections.

Thus for example, the enumerated set of use cases 215 can specify by name the three use case factors described here, optionally with a description of the strengths and weaknesses of each.

The developer device 210 provides a use case selection (225). For example, the developer can issue the following example command line command:

$>sc select_type message_broker low_latency

This command has a term "select type" that identifies an action, as well as a term "message_broker," that names a message broker created by the previous command. The command also has a term "low_latency" that names one of the enumerated use cases provided by the system controller 240.

The system controller 240 then provides one or more use-case-specific prompts for message properties (235). This step allows the developer to specify certain expected parameters of the messages in the operating environment. The system controller 240 will use these parameters in order to provision appropriate resources for and to appropriately configure a message broker cluster.

The prompts are use-case-specific because some message parameters are more relevant or critical to achieve expected performance for some use cases.

For example, for a low-latency use case, the system controller 240 can prompt the developer to provide an expected average or maximum message size, an average or maximum message rate, and a target latency. The system controller 240 can then compute parameters of the computing resources that need to be provisioned in order to realize the target latency provided by the developer, given the message parameters and the known capabilities of the underlying computing platform. As part of this process, the system controller 240 can use a predefined message broker configuration that is specific to the low-latency use case. This is described in more detail below.

If the target latency is not possible with the given parameters, the system controller 240 can provide a notification to the developer indicating that the target latency is not possible and can prompt the developer to enter different message parameters or a different target latency. Alternatively or in addition, the system controller 240 can provide a response to the developer indicating what the best case scenario latency would be for the given message parameters.

For a high-throughput use case, the system controller 240 can prompt the developer to provide an expected average or maximum message size and a target rate. The system controller 240 can then compute parameters of the computing resources that need to be provisioned in order to realize the target rate provided by the developer. The system controller 240 can similarly use a predefined message broker configuration that is specific to the high-throughput use case. If the target rate is not possible with the given parameters, the system controller 240 can provide a notification to the developer indicating that the target rate is not possible and can prompt the developer to enter different message parameters or a different target rate. Alternatively or in addition, the system controller 240 can provide a response to the developer indicating what the best case scenario message rate would be for the given message parameters.

For a high-scale use case, the system controller 240 can prompt the developer to provide an expected average or maximum message size and a target number of simultaneous connections. The system controller 240 can then compute parameters of the computing resources that need to be provisioned in order to realize the target number of simultaneous connections provided by the developer. The system controller 240 can similarly use a predefined message broker configuration that is specific to the high-scale use case. If the target scale is not possible with the given parameters, the system controller 240 can provide a notification to the developer indicating that the target scale is not possible and can prompt the developer to enter different message parameters or a different target scale. Alternatively or in addition, the system controller 240 can provide a response to the developer indicating what the best case scenario number of simultaneous connections would be for the given message parameters.

The power of this type of guided configuration is that because of the integrated nature of the platform system, e.g., as illustrated in FIG. 1, the system controller 240 has the ability to use predefined message broker configurations that touch all layers of configuration options. For example, because the system controller 240 can use on-demand resource provisioning, the system controller 240 can specify very detailed hardware configurations at the lowest layer, e.g., minimum CPU frequency, as well as very detailed message broker configurations at the highest layer, as well as all other layers in between. What would have taken a developer days or weeks to configure and test for a particular use case can instead be accomplished in minutes.

In addition, the system controller 240 has access to rich information about the underlying computing infrastructure that a developer might not have. The system controller 240 can use previously established benchmarks regarding what kinds of throughput or latency are achievable with particular network or computing hardware combinations. This information is very useful because it may be difficult or impossible for a developer to perform their own realistic testing or benchmarking for a particular use case. For example, it can be difficult for a developer to set up and test a high-scale use case with 100,000 simultaneous connections in order to see how the underlying infrastructure responds. In contrast, the system controller 240 does have the ability to set up and benchmark such tests or can access previous configurations having the same parameters, and thus the system can utilize pregenerated benchmarks in order to achieve developers' goals without the need for more testing.

As shown in FIG. 2, the developer can then push a software task to be executed by a particular software platform (255). For example, the developer can issue the following example command to the system controller 240:

$>ac create instance myapplication

The example command includes a term "ac" that identifies a particular software platform. In this example, the command names an application controller of a cloud application platform that will handle implementation of the command. In this example, the command references an application named "myapplication" that was developed by the developer for the cloud application platform. After launching one or more instances of the application, the cloud application platform can return one or more application ids back to the system controller 240 for display to the developer.

As described above, the system can provide hardware isolation by launching the application using computing resources that are separate from the resources that were just provisioned for the message broker cluster.

The developer can then bind the software task to the initialized message broker cluster (265). For example, the developer can issue the following example command to the system controller 240:

$> sc create binding message_broker --platform cf1 myapplication

This bind command names the previously provisioned message broker, "message broker," and also names both a particular platform, "cf1," as well as an application launched on the platform, "myapplication."

Upon receiving this command, the system controller 240 can register instances of the application with the message broker cluster on the message broker platform. Thereafter, executing instances of the developer's application can publish messages to and receive messages from the message broker cluster.

The developer can optionally repeat steps 255 and 265 for an arbitrary number of other software tasks and software platforms. For example, the developer can also launch a container workload on a container orchestration platform and bind the container workload to the message broker cluster in a similar way. Thereafter, executing container workloads can publish messages to and receive messages from the message broker cluster.

Notably, the two different software platforms can use the common message broker cluster to communicate. For example, an application instance on the cloud application platform can publish a message to the message broker cluster on the message broker platform, and the message broker cluster can route the message to a container workload executing on the container orchestration platform.

Figure 3:
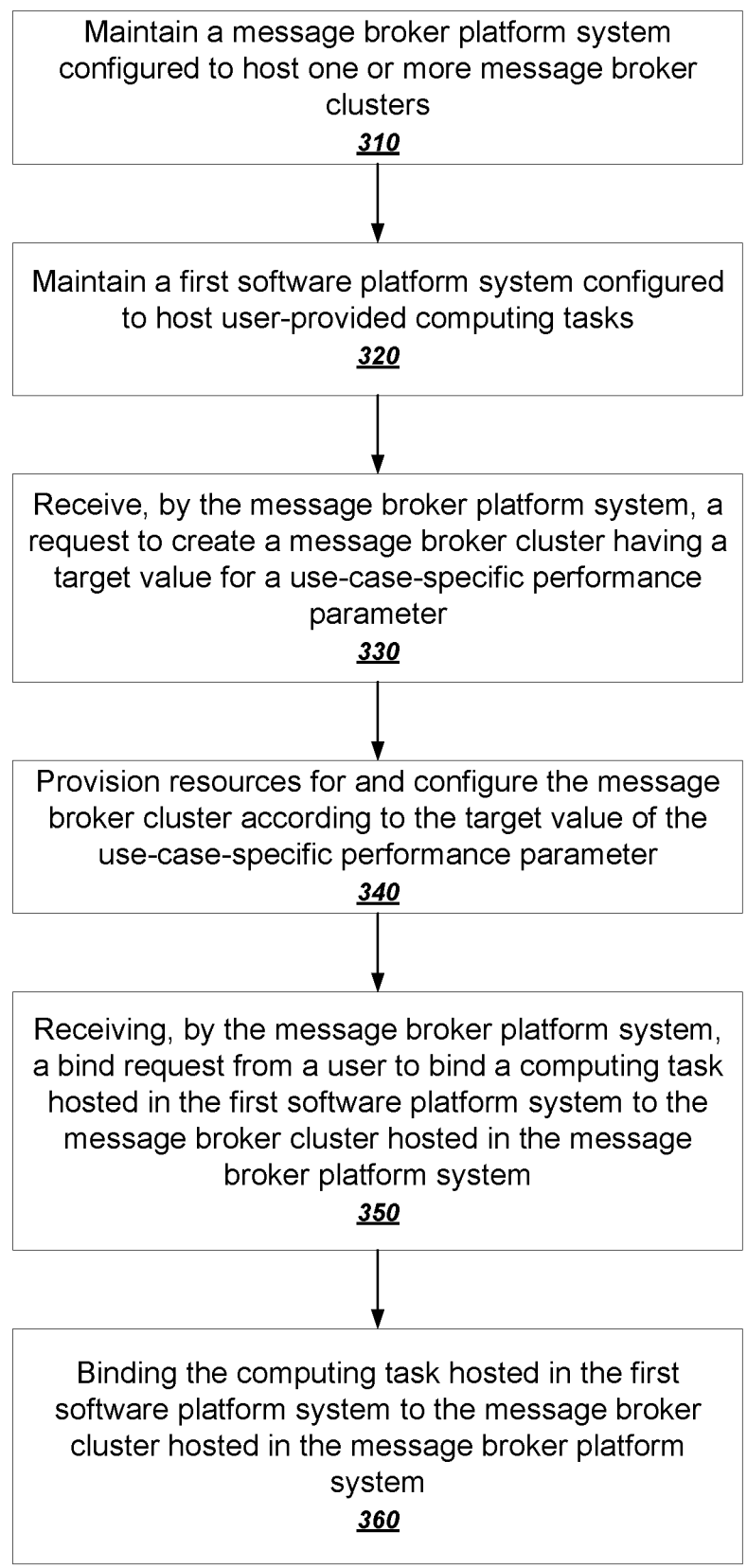
FIG. 3 is a flowchart of an example process for configuring a message broker cluster.

FIG. 3 is a flowchart of an example process for configuring a message broker cluster. For convenience, the process will be described as being performed by a distributed system having a plurality of computers in an underlying cloud computing system and programmed appropriately in accordance with this specification. For example, the system 100 of FIG. 1, appropriately programmed can perform the example process.

The system maintains a message broker platform system configured to host one or more message broker clusters (310). In general, a message broker cluster includes one or more logical computing nodes that each execute a plurality of utilities that implement the message broker. The logical computing nodes can be implemented by physical or virtual machines or containers.

The suite of utilities that implement the message broker varies according to which message broker is being used. But in general, each node executes utilities that provide functionality for receiving and routing of messages, storing messages in message queues, and maintaining a database of message metadata. For example, in RabbitMQ there are utilities for implementing exchanges that receiving messages and route messages to queues or to other exchanges. There are also utilities for processing queues. And there are utilities for managing a synchronized database of message metadata. In general each node of the message broker cluster runs its own instance of each utility, and each of the nodes can work to maintain synchronization of the metadata database.

The system maintains a first software platform system configured to host user-provided computing tasks (320). As described above, the first software platform system can be a cloud application platform that launches instances of platform applications, a container orchestration platform that launches clusters of container workloads, or another appropriate software platform system.

The system receives, by the message broker platform system, a request to create a message broker cluster having a target value for a performance parameter (330). A user can directly specify the properties of the message broker cluster, e.g., by issuing a command line command. Alternatively or in addition, the system can also engage in a configuration dialog as described above with reference to FIG. 2 in which the system prompts the user to select a particular use case and then asks the user to provide use-case-specific message parameters and a target value for a use-case-specific performance parameter.

The system provisions resources for and configures the message broker cluster according to the target value of the use-case-specific performance parameter (340). As described above, a message broker cluster has multiple layers of configurations. The system can use predefined configurations for the selected use case in order to initialize a message broker cluster that satisfies the target value for the use-case-specific performance parameter.

As mentioned above, because the system has the ability to perform on-demand resource provisioning for the message broker cluster, the system can fine tune the configuration of the message broker cluster for a particular selected use case at all configuration levels of the message broker cluster architecture. This process saves the user from engaging in a process that previously would have taken days or weeks of experimentation to achieve a target value of a performance parameter.

A number of predefined configurations for particular use cases will now be described. Some of the parameters are static, while others will depend on the message parameters specified by the developer as well as the target value of the performance parameter.

For the high-throughput use case, the system can select the following use-case-specific options:

For the Message Broker Layer:
No queue mirroring. Queue mirroring allows copies of queues to be stored on multiple nodes in a master slave configuration. Without queue mirroring, a queue is stored only on one node of the cluster.
Queue type: lazy. Lazy queues move their contents to disk as soon as possible, and only load messages into RAM when requested by consumers. By selecting a lazy queue, the message broker cluster has less pressure on memory, which allows the cluster to achieve higher throughput.
Enable sharding. Sharding allows multiple queue shards per node. Sharding helps to increase the throughput by providing better load balancing than without sharding.

For the Client Layer:
Suggest a fast client implementation. Although the system cannot choose the client implementation for the developer, the system can provide a suggestion that the client be implemented in a faster environment. For example, Java and Golang tend to be faster than Ruby. Therefore, the system can suggest that the client be implemented in Java or Golang rather than Ruby.

For the Runtime Layer:
Enable multiple queues. A single queue generally cannot store all messages, so enabling multiple queues allows for higher throughput.
Enable multiple port connections. Similarly, a single port cannot go infinitely fast, therefore, higher throughput is achieved using multiple ports.

For the OS Layer:
Enable multiple nodes. By enabling multiple cluster nodes, the effect of even slower-performing operating systems can mitigated.

For the IaaS Layer:
Provision network resources according to target throughput. If the target throughput is not achievable, raise an error.
Provision disks according to the target throughput. The system can compute a value for the required input/output operations per second for the target throughput and provision disks accordingly.
Choose fastest possible memory frequency.
Choose fastest possible CPU frequency.

For the high-scale use case, the system can select the following use-case-specific options:

For the Message Broker Layer:
No queue mirroring.
Queue type: lazy.
Queue depth: limited. The system can use the target value for the number of simultaneous connections to compute a maximum size of the queue. This will mitigate the possibility of crashes when nodes are preloading too many messages from memory.
Exchange type: prefer direct exchanges or fanout exchanges over topic exchanges or header exchanges.

For the Client Layer:
Use basic consume rather than basic get. Basic consume is a client operation that takes the next message off a queue without first checking to see if a next message exists. If there are thousands of queues, basic gets become very expensive. Therefore, the system can encourage the user to use basic consume for the client.

For the Runtime Layer:
Tune memory allocators for the target value of the performance parameter.
Scheduler thread busy wait: enabled. This prevents the runtime from keeping schedulers alive longer than need be.

For the OS Layer:
TCP Tuning: limited. It is important to cap the connections because otherwise more memory will be consumed than necessary.

For the IaaS Layer:
Disks: have one disk node and one RAM node.
Memory frequency: choose fastest possible memory frequency For the low-latency use case, the system can select the following use-case-specific options:

For the Message Broker Layer:
No queue mirroring.

For the Client Layer:
Publisher confirms every 10 messages or more

For the OS Layer:
Enable many connections

For the IaaS Layer:
Minimize network hopes
Choose fastest possible CPUs.

The system receives, by the message broker platform system, a bind request from a user to bind a computing task hosted in the first software platform system to the message broker cluster hosted in the message broker platform system (350).

The system binds the computing task hosted in the first software platform system to the message broker cluster hosted in the message broker platform system (360). As described above, the developer can also bind other software tasks on other computing platforms to the same message broker cluster and still maintain hardware isolation for the message broker cluster.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method performed by a distributed computing system comprising a plurality of computers, the method comprising:

maintaining a message broker platform system configured to host one or more message broker clusters in a cloud computing environment of the distributed computing system;

maintaining a first software platform system configured to host user-provided computing tasks in a cloud computing environment of the distributed computing system;

provisioning, by the message broker platform system, computing resources in an underlying cloud computing infrastructure to implement one or more nodes of a message broker cluster;

launching, by the message broker platform system, the message broker cluster using the provisioned computing resources in the underlying cloud computing infrastructure;

receive, by the first software platform system, a computing task;

provisioning, by the first software platform system, computing resources in the underlying cloud computing infrastructure for the computing task;

launching, by the first software platform system, one or more instances of the computing task using the provisioned computing resources in the underlying cloud computing infrastructure; and receiving, by the message broker platform system, a bind request from a user to bind the computing task to the message broker cluster in the message broker platform system.

Embodiment 2 is the method of embodiment 1, wherein message broker cluster in the message broker platform system has hardware isolation from provisioned resources for computing tasks in the first software platform system.

Embodiment 3 is the method of any one of embodiments 1-2, wherein the first software platform system is a container orchestration platform configured to host container workloads in a first container cluster.

Embodiment 4 is the method of any one of embodiments 1-3, wherein the first software platform system is a cloud application platform configured to host developer-supplied applications.

Embodiment 5 is the method of embodiment 4, further comprising:

maintaining a container orchestration platform that is separate from the cloud application platform, wherein the container orchestration platform is configured to host container workloads in a container cluster, wherein the message broker platform system is configured to bind a single message broker cluster to both applications hosted by the cloud application platform and container workloads hosted by the container orchestration platform.

Embodiment 6 is the method of any one of embodiments 1-5, further comprising:

receiving, by a system controller from a developer device, a request to initialize a message broker cluster;

providing, by the system controller to the developer device, a request to select one of a plurality of enumerated use cases for the message broker cluster;

receiving, by the system controller from the developer device, a selected use case among the plurality of enumerated use cases for the message broker cluster; and provisioning resources and configuring the message broker cluster according to the selected use case for the message broker cluster.

Embodiment 7 is the method of embodiment 6, further comprising:

providing, by the system controller to the developer device, one or more prompts to provide message properties for messages to be processed by the message broker cluster and a target value for a performance parameter for the selected use case for the message broker cluster; and receiving, by the system controller from the developer device, one or more message properties and a target value for the performance parameter for the selected use case for the message broker cluster, wherein provisioning resources and configuring the message broker cluster according to the selected use case for the message broker cluster comprises provisioning resources and configuring the message broker cluster to satisfy the received target value for the performance parameter for the selected use case for the message broker cluster.

Embodiment 8 is the method of embodiment 7, wherein providing the request to select one of a plurality of enumerated use cases comprises providing a request to select from among a low-latency configuration, a high-throughput configuration, and a high-scale configuration.

Embodiment 9 is the method of embodiment 8, wherein the performance parameter for the low-latency configuration is a target latency, the performance parameter for the high-throughput configuration is a target message rate, and the performance parameter for the high-scale configuration is a target number of simultaneous connections.

Embodiment 10 is the method of any one of embodiments 1-9, wherein the message broker cluster has a plurality of layers of configuration parameters, and wherein provisioning resources and configuring the message broker cluster according to the selected use case for the message broker cluster comprises using predefined values for configuration parameters in all of the plurality of layers.

Embodiment 11 is the method of embodiment 10, wherein the plurality of layers of configuration parameters include a message broker layer, a runtime layer, an operating system layer, and a hardware layer.

Embodiment 12 is a distributed system comprising a plurality of computers and one or more storage devices storing instructions that are operable, when executed by the plurality of computers, to cause the plurality of computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers perform operations comprising:
maintaining a message broker platform system configured to host one or more message broker clusters in a cloud computing environment of the distributed computing system, wherein the message broker platform system is configured to provision computing resources in an underlying cloud computing infrastructure to implement one or more nodes of a message broker cluster and launch the message broker cluster using the provisioned computing resources in the underlying cloud computing infrastructure, wherein the message broker cluster can receive messages from or provide messages to an associated computing task;
maintaining a first software platform system configured to host user-provided computing tasks in a cloud computing environment of the distributed computing system, wherein the first software platform system is configured to receive a computing task, provision computing resources in an underlying cloud computing infrastructure, and launch one or more instances of the computing task using the provisioned computing resources in the underlying cloud computing infrastructure; and
wherein the message broker platform system is configured to receive a bind request from a user to bind the computing task hosted on the first software platform to the message broker cluster in the message broker platform system, wherein in response to binding the computing task, the computing task publishes messages to and receives messages from the message broker cluster.

2. The system of claim 1, wherein message broker cluster in the message broker platform system has hardware isolation from provisioned resources for computing tasks in the first software platform system.

3. The system of claim 1, wherein the first software platform system is a container orchestration platform configured to host container workloads in a first container cluster.

4. The system of claim 1, wherein the first software platform system is a cloud application platform configured to host developer-supplied applications.

5. The system of claim 4, wherein the operations further comprise:
maintaining a container orchestration platform that is separate from the cloud application platform, wherein the container orchestration platform is configured to host container workloads in a container cluster,
wherein the message broker platform system is configured to bind a single message broker cluster to both applications hosted by the cloud application platform and container workloads hosted by the container orchestration platform.

6. The system of claim 1, wherein the operations further comprise:
receiving, by a system controller from a developer device, a request to initialize a message broker cluster;
providing, by the system controller to the developer device, a request to select one of a plurality of enumerated use cases for the message broker cluster;
receiving, by the system controller from the developer device, a selected use case among the plurality of enumerated use cases for the message broker cluster; and
provisioning resources and configuring the message broker cluster according to the selected use case for the message broker cluster.

7. The system of claim 6, wherein the operations further comprise:
providing, by the system controller to the developer device, one or more prompts to provide message properties for messages to be processed by the message broker cluster and a target value for a performance parameter for the selected use case for the message broker cluster; and
receiving, by the system controller from the developer device, one or more message properties and a target value for the performance parameter for the selected use case for the message broker cluster,
wherein provisioning resources and configuring the message broker cluster according to the selected use case for the message broker cluster comprises provisioning resources and configuring the message broker cluster to satisfy the received target value for the performance parameter for the selected use case for the message broker cluster.

8. The system of claim 7, wherein providing the request to select one of a plurality of enumerated use cases comprises providing a request to select from among a low-latency configuration, a high-throughput configuration, and a high-scale configuration.

9. The system of claim 8, wherein the performance parameter for the low-latency configuration is a target latency, the performance parameter for the high-throughput configuration is a target message rate, and the performance parameter for the high-scale configuration is a target number of simultaneous connections.

10. The system of claim 1, wherein the message broker cluster has a plurality of layers of configuration parameters, and wherein provisioning resources and configuring the message broker cluster according to the selected use case for the message broker cluster comprises using predefined values for configuration parameters in all of the plurality of layers.

11. The system of claim 10, wherein the plurality of layers of configuration parameters include a message broker layer, a runtime layer, an operating system layer, and a hardware layer.

12. A method performed by a distributed computing system comprising a plurality of computers, the method comprising:
maintaining a message broker platform system configured to host one or more message broker clusters in a cloud computing environment of the distributed computing system;

maintaining a first software platform system configured to host user-provided computing tasks in a cloud computing environment of the distributed computing system;

provisioning, by the message broker platform system, computing resources in an underlying cloud computing infrastructure to implement one or more nodes of a message broker cluster;

launching, by the message broker platform system, the message broker cluster using the provisioned computing resources in the underlying cloud computing infrastructure, wherein the message broker cluster can receive messages from or provide messages to an associated computing task;

receive, by the first software platform system, a computing task;

provisioning, by the first software platform system, computing resources in the underlying cloud computing infrastructure for the computing task;

launching, by the first software platform system, one or more instances of the computing task using the provisioned computing resources in the underlying cloud computing infrastructure; and receiving, by the message broker platform system, a bind request from a user to bind the computing task of the first software platform to the message broker cluster in the message broker platform system, wherein in response to binding the computing task, the computing task publishes messages to and receives messages from the message broker cluster.

13. The method of claim 12, wherein message broker cluster in the message broker platform system has hardware isolation from provisioned resources for computing tasks in the first software platform system.

14. The method of claim 12, wherein the first software platform system is a container orchestration platform configured to host container workloads in a first container cluster.

15. The method of claim 12, wherein the first software platform system is a cloud application platform configured to host developer-supplied applications.

16. The method of claim 15, further comprising:
maintaining a container orchestration platform that is separate from the cloud application platform, wherein the container orchestration platform is configured to host container workloads in a container cluster, wherein the message broker platform system is configured to bind a single message broker cluster to both applications hosted by the cloud application platform and container workloads hosted by the container orchestration platform.

17. The method of claim 12, further comprising:
receiving, by a system controller from a developer device, a request to initialize a message broker cluster;

providing, by the system controller to the developer device, a request to select one of a plurality of enumerated use cases for the message broker cluster;

receiving, by the system controller from the developer device, a selected use case among the plurality of enumerated use cases for the message broker cluster; and provisioning resources and configuring the message broker cluster according to the selected use case for the message broker cluster.

18. The method of claim 17, further comprising:
providing, by the system controller to the developer device, one or more prompts to provide message properties for messages to be processed by the message broker cluster and a target value for a performance parameter for the selected use case for the message broker cluster; and receiving, by the system controller from the developer device, one or more message properties and a target value for the performance parameter for the selected use case for the message broker cluster, wherein provisioning resources and configuring the message broker cluster according to the selected use case for the message broker cluster comprises provisioning resources and configuring the message broker cluster to satisfy the received target value for the performance parameter for the selected use case for the message broker cluster.

19. The method of claim 18, wherein providing the request to select one of a plurality of enumerated use cases comprises providing a request to select from among a low-latency configuration, a high-throughput configuration, and a high-scale configuration.

20. The method of claim 19, wherein the performance parameter for the low-latency configuration is a target latency, the performance parameter for the high-throughput configuration is a target message rate, and the performance parameter for the high-scale configuration is a target number of simultaneous connections.

21. The method of claim 12, wherein the message broker cluster has a plurality of layers of configuration parameters, and wherein provisioning resources and configuring the message broker cluster according to the selected use case for the message broker cluster comprises using predefined values for configuration parameters in all of the plurality of layers.

22. The method of claim 21, wherein the plurality of layers of configuration parameters include a message broker layer, a runtime layer, an operating system layer, and a hardware layer.

23. One or more non-transitory computer storage media encoded with computer program instructions that when executed by a distributed computing system comprising a plurality of computers cause the plurality of computers to perform operations comprising:

maintaining a message broker platform system configured to host one or more message broker clusters in a cloud computing environment of the distributed computing system, wherein the message broker platform system is configured to provision computing resources in an underlying cloud computing infrastructure to implement one or more nodes of a message broker cluster and launch the message broker cluster using the provisioned computing resources in the underlying cloud computing infrastructure, wherein the message broker cluster can receive messages from or provide messages to an associated computing task;

maintaining a first software platform system configured to host user-provided computing tasks in a cloud computing environment of the distributed computing system, wherein the first software platform system is configured to receive a computing task, provision computing resources in an underlying cloud computing infrastructure, and launch one or more instances of the computing task using the provisioned computing resources in the underlying cloud computing infrastructure; and wherein the message broker platform system is configured to receive a bind request from a user to bind the computing task hosted by the first software platform to the message broker cluster in the message broker platform system, wherein in response to binding the computing task, the computing task publishes messages to and receives messages from the message broker cluster.

\* \* \* \* \*